United States Patent [19]

Monus

[11] Patent Number: 5,081,954
[45] Date of Patent: Jan. 21, 1992

[54] METHOD OF RAISING FISH

[75] Inventor: Donald T. Monus, Largo, Fla.

[73] Assignee: Alfred R. Priest, Belleair, Fla.; a part interest

[21] Appl. No.: 736,107

[22] Filed: Jul. 26, 1991

[51] Int. Cl.⁵ .............................................. A01K 63/04
[52] U.S. Cl. ............................................ 119/3; 119/5; 210/108; 210/169
[58] Field of Search .................. 119/2, 3, 4, 5; 210/108, 169

[56] References Cited

U.S. PATENT DOCUMENTS

| | | | |
|---|---|---|---|
| 3,255,731 | 6/1966 | Girard | 119/3 |
| 3,320,928 | 5/1967 | Smith | 119/3 |
| 3,661,262 | 5/1972 | Sanders | 119/3 |
| 3,741,158 | 6/1973 | Moe et al. | 119/3 |
| 3,886,902 | 6/1975 | Haynes | 119/3 |
| 3,998,186 | 12/1976 | Hodges | 119/2 |
| 4,043,299 | 8/1977 | Birkbeck et al. | 119/3 |
| 4,052,960 | 10/1977 | Birkbeck et al. | 119/3 |
| 4,182,267 | 1/1990 | Kominami et al. | 119/3 |
| 4,211,183 | 7/1980 | Hoult | 119/3 |
| 4,892,651 | 1/1990 | Hill | 210/151 |
| 4,951,606 | 8/1990 | Hartung | 119/3 |

FOREIGN PATENT DOCUMENTS 2229071 9/1990 United Kingdom ................ 119/3

Primary Examiner—John G. Weiss
Attorney, Agent, or Firm—Herbert W. Larson

[57] ABSTRACT

Water from a fish growth tank is pumped through multiple filter tanks containing a filter media and injected with ammonia fixing bacteria. Metabolic wastes from the fish growth tank are absorbed by hydroponic or sand growth beds. Oxygen content and temperature of the water is constantly monitored by sensors and air blowers and heaters are activated when oxygen level or temperature respectively falls below the prescribed conditins for growth of the fish. All backwash water from a sludge digestion area is recirculated to the fish growth tank to conserve water in the system.

10 Claims, 3 Drawing Sheets

METHOD OF RAISING FISH

BACKGROUND OF THE INVENTION

1. Field of the Invention

This invention relates to fish farming More particularly, it relates to a method of raising fish in a controlled environment containing a variable bacteria media and a continuous effluent removal system.

2. Description of the Prior Art

The raising of fish for market is a rapidly developing industry in the United States Although Asian and European fish culture systems have existed for centuries, they have existed in a quasi wild state. Intensive concentrations of fish within a small growing tank was not feasible until recently, since natural metabolic activity of the fish produced sufficient wastes to eventually either kill or radically stunt the growth of the fish.

Attempts have been made in recent years to grow fish in restricted tanks in high concentrations such as set forth in U.S. Pat. No. 3,886,902; 4,182,267; 4,211,183; 4,892,651 and 4,951,606. While these patents describe methods of growing fish intensively, they require large amounts of power, fresh water or an elaborate tank cleaning process. A system is needed to raise fish in a limited space environment without the use of substantial energy resources either from electric power or flowing water.

SUMMARY OF THE INVENTION

I have invented a system of raising fish in a limited space with controlled release of oxygen, limited need for electric power and a negligible demand for resupply of fresh water.

My invention is a series of six tanks filtering the water utilized for raising the fish and employing specific filter media and bacteria controlling the waste ammonia produced by the fish. Sufficient amounts of oxygen are added automatically to maintain the supply constantly at greater than four parts per million. A solar heating system maintains the water at a proper temperature and natural hydroponic or sand grown plants assist in eliminating fish metabolic wastes.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
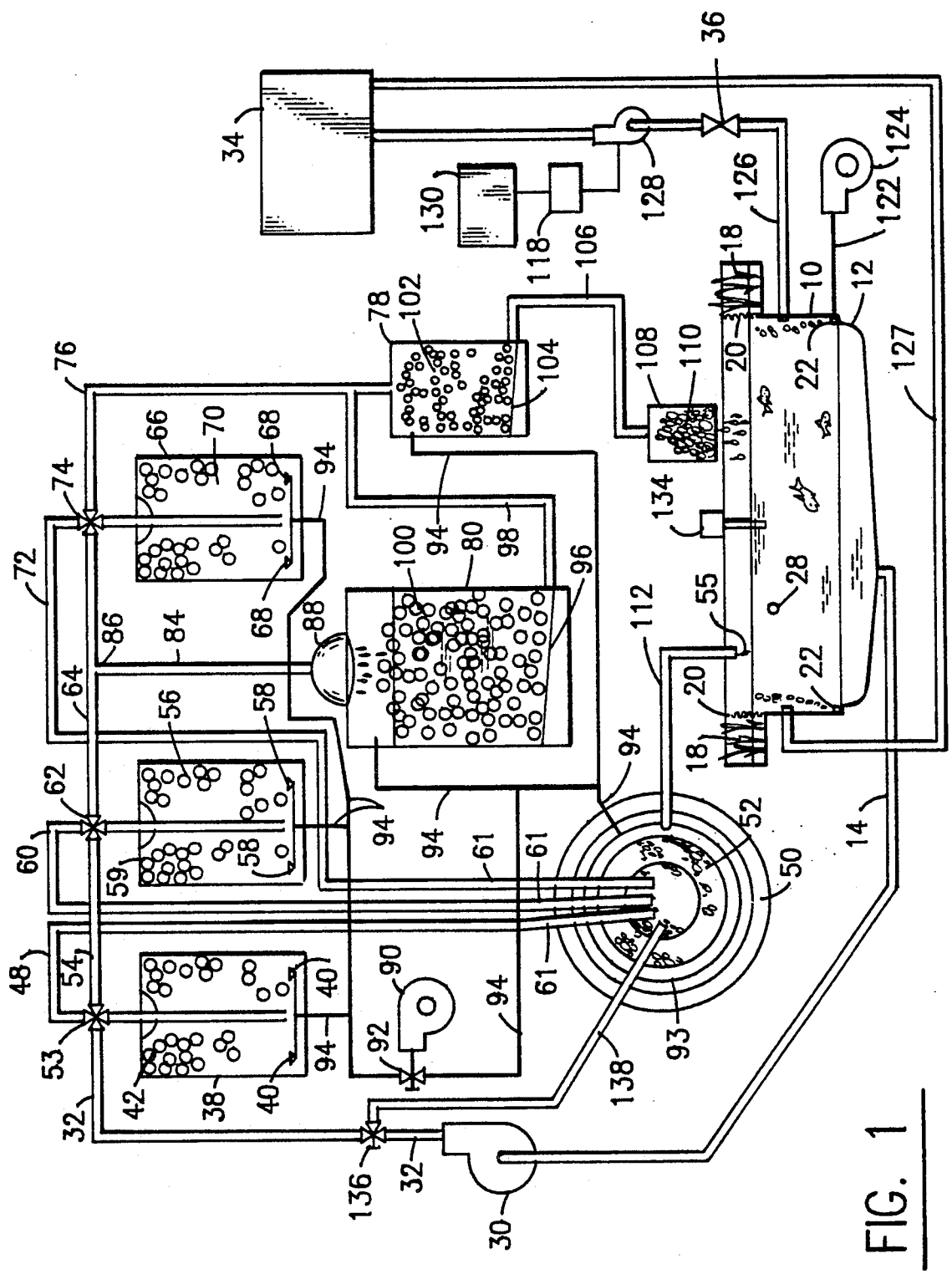
FIG. 1 is a schematic view of the method for raising fish.

Throughout the following detailed description, the same reference numerals refer to the same elements in all figures.

Figure 2:
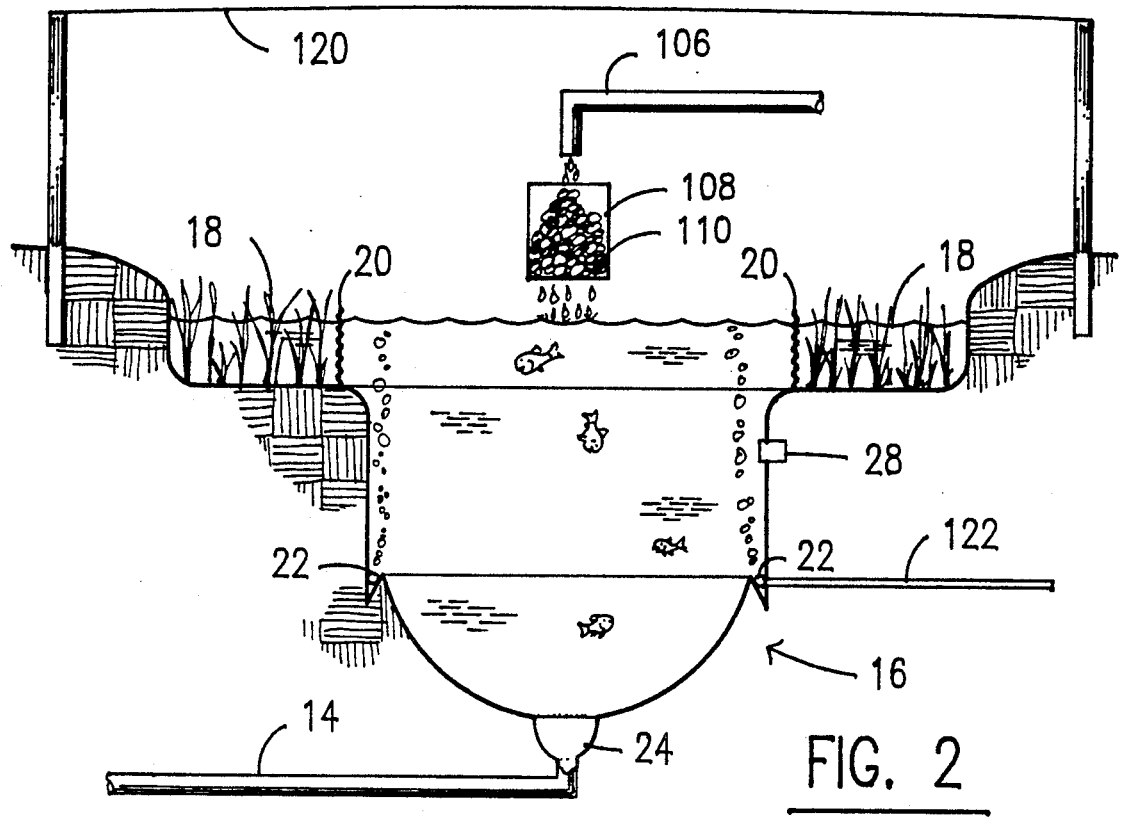
FIG. 2 is an elevational view in section through an alternate fish habitat tank.
Figure 3:
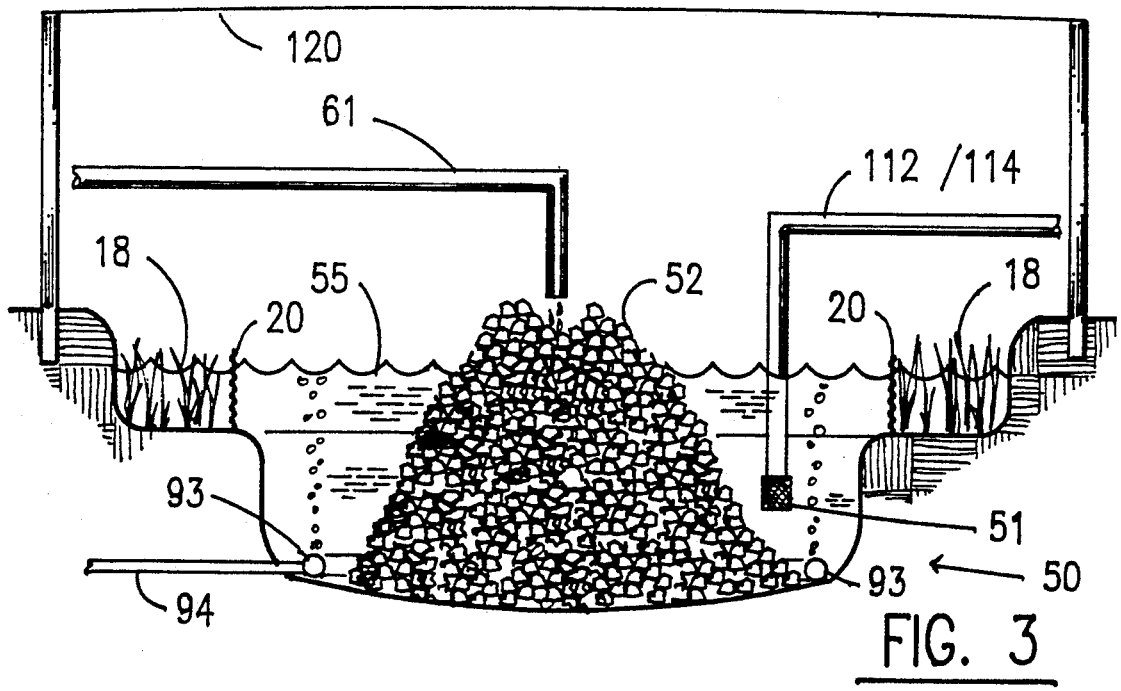
FIG. 3 is an elevational view in section through a rock sludge digestion area.
Figure 4:
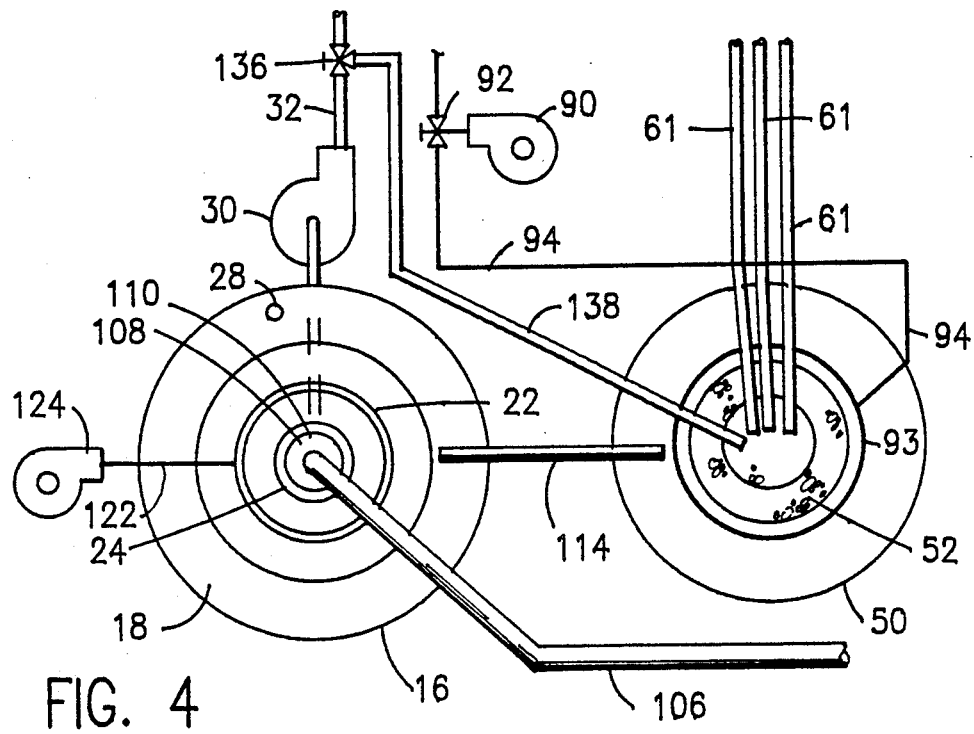
FIG. 4 is a partial schematic view of the system of the invention employing the alternate tank of FIG. 2.
Figure 5:
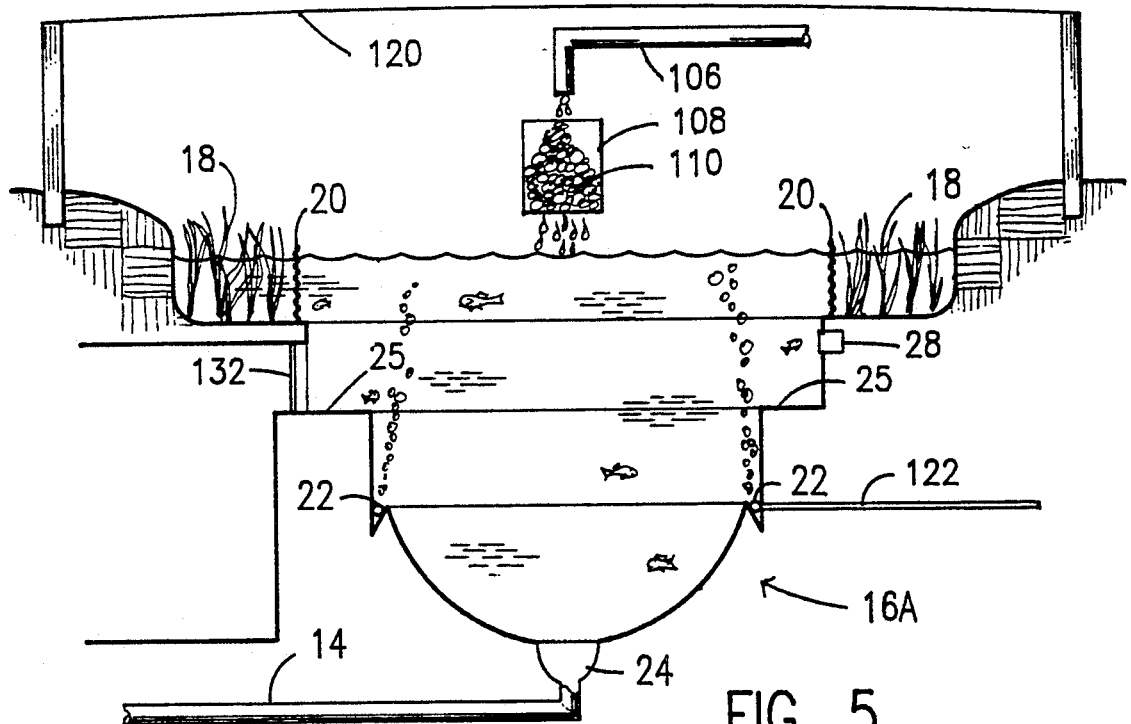
FIG. 5 is an elevational view in section through another alternate fish habitat tank.

My method of raising fish is shown schematically in FIG. 1. A large rectangular fish growth tank 10 containing about ten thousand gallons of water in a preferred embodiment contains the fish during their growth cycle. Approximately 667 fish weighing up to three pounds can be maintained in this tank 10, or round tanks 16, or 16A depicted in FIGS. 2 and 5, respectively. Solid fecal material is collected at the bottom of tank 10 in a basin 12 and is carried away from the tank 10 through an outlet pipe 14 and pumped to filter tank 38. An oxygen diffuser 22 located in an indented area on the edge of tanks 10, 16 and 16A provide oxygenation to the fish. A sump 24 at the bottom of tank 16 or 16A leads to pipe 14 outwardly from tank 16 or 16A. An oxygen sensor 28 is located in a fish growth area of tank 10, 16 or 16A to determine the amount of oxygen in the tank. If the amount of dissolved oxygen is lower than four parts per million, additional oxygen is added to the system through oxygen diffuser 22.

Pump 30 pumps the water from the growth tank to the filters through pipe 32 starting at filter 38. Tank 38 is about two-thirds full of a ceramic and gravel mixture 42. The ceramic and gravel 42 in tank 38 has a diameter of about one-half inch. About one-half the gravel is solid and one-half has a hollow core. The water flows through tank 38 at a rate to completely circulate the water in the system, a minimum of three times every twenty-four hours.

Bacteria such as *Thiobacillus denitrifican,* is located in filter tanks 38, 59 and 66. *Pseudomonas chlororaphis* would be used if plants 18 are not grown as part of the denitrification process and would only be found in tanks 59 and 66.

Air jets 40 at the bottom of tank 38 develop pressure for the water to backwash tank 38. In this circumstance, the backwashed material flows out through backwash control valve 53 and pipe 48 to pipe 61 and then into a rock sludge digestion area 50 containing non-elementacious leaching lava rock 52, or regular rock not larger than one inch.

If no backwash is required, the effluent from tank 38 flows out through valve 53 and pipe 54 into the second filter tank 59 containing jets 58 for a backwash system. Tank 59 contains super-activated charcoal 56 as a filter media about two-thirds full. The media size should be approximately three-eighths inch in diameter. If tank 59 is backwashed, the jets 58 are activated and the washed out material flows through pipe 60, through backwash control valve 62 down through pipe 61 into the rock sludge digestion area 50. If tank 59 does not have to be backwashed, the effluent flows out through pipe 64 into filter tanks 66 and 80.

A mixing point 86 diverts some of the water from filter tank 59 into filter tank 80 which contains a plastic bio-media 100 two inches in diameter and Nitrosomonas bacteria. A deflection head 88 slows down the force of the water as it enters tank 80 through pipe 84.

Tank 66 also contains some jets 68 that are available to backwash tank 66. Tank 66 is filled with hollow core ceramic chips 70 about one-half inch in diameter. If backwash is required, the backwash flows out through pipe 72, through backwash control valve 74 back through pipe 61 down into the rock sludge digestion area 50. If tank 66 does not have to be backwashed, the effluent flows out through pipe 76 down into filter tank 78. The bacteria in tank 66 are primarily *Thiobacillus denitrifican.*

Filter tank 78 contains a plastic bio-media 102 of about one-half inch diameter and Nitrobacter. Tank 78 also receives effluent from filter tank 80. Tank 80 contains a water collection plate 96 directing the water flow through pipe 98 to tank 78.

In tanks 80 and 78 containing the plastic media filter, the media 102 in tank 78 should be about one-half the size of the media 100 in tank 80.

Filter tank 78 has a water collector plate 104 directing the water through pipe 106, to a tank 108 containing non-leaching elementacious lava rock 110. The water drips through this lava rock 110 into tank 10 to start the cycle over again. Tank 108 should contain Azotobacter.

Clean water effluent 55 from the sludge tank 50 passes through screen 51 and then through pipe 112 into tank 10 or pipe 114 into tanks 16 or 16A. The water in the sludge tank 50 is oxygenated by line 94 from pump 90. A diffuser 93 distributes the oxygen in the sludge tank. A drain line 138 controlled by valve 136 permits drainage of tank 50 for cleaning.

Filter screen 20 shown in FIGS. 1, 2, 3 and 5 prevents debris from the hydroponic growth area from being deposited into any adjacent tank. The plants 18 in the tanks absorb fish metabolic products and thereby continuously cleanse the water.

A blower 90 electrically actuated by the oxygen sensor 28 opens valve 92 to permit the flow of air through line 94 to the various tanks indicated on FIG. 1. Each of the tanks need air pressure at a minimum of six pounds per square inch. A separate blower 124 pumps oxygen through line 122 into the oxygen diffuser 22 around fish growth tanks 10, 16, or 16A in response to the oxygen sensor 28.

The system also contains an emergency trip generator (not shown) to provide electrical power in case of power outage to any of the oxygen generators. Alternatively, a separate emergency oxygen tank (not shown) can provide oxygen if the oxygen alarm 28 determines that less than 4 ppm of oxygen is in the water portion of the system.

Tank 10 also contains a thermostat 134 electrically connected to valve 36 and pump 128. The pump 128 is operated by a photoelectric cell 130 which stores excess electrical energy in battery 118. If the thermostat 134 indicates a low temperature reading, valve 36 and pump 128 are actuated to circulate water out of tank 10 through pipe 126 to area 34 containing solar heating panels. The water is heated in area 34 either by the solar heating panels or by a back-up heating source. The heated water is returned to tank 10 by pipe 127.

The solar water heater 34 used in the system has a minimum of four, four by eight fee. sheets to heat a system containing 10,000 gallons of water. Greater heat input is required during periods o low temperature since specific species of fish are sensitive to a lowered temperature.

In the described system, very little water is lost except to evaporation since even during backwash operations, the water is recovered from the rock sludge digestion area 50.

The described system can be converted to a salt water fish raising system by adding about 30,000 to 33,000 ppm sea salt to the water and changing the activated carbon 56 in filter tank 59 to about two-thirds full of oyster shell no larger than three-quarter inch in diameter. Young mangroves or other types of salt water plants can be substituted for the fresh water plants 18 shown in FIG. 2. A typical salt water tank 16A shown in FIG. 5 has a shelf 25 above the bubble stream generated by diffuser 22. A view point 132 can be added to the side of tank 16A to view the fish.

The system for raising fish described above can be interfaced with a computer programmed to feed the fish, activate the backwash system and control the oxygen and heat sensors.

The oxygen sensor employed can be an Oxytrol 4080 oxygen monitor and control system.

Each of the tanks 10, 16 and 16A as well as the digester 50 have a woven polyvinyl chloride canopy 120 mounted over the water to reduce sunlight from sixty to eighty percent and therefore, eliminate the proliferation of algae growth.

Typical fish raised in the system described above include catfish, talapia, hybrid striped bass, redfish and snook. Talapia is the preferred fish at a temperature of eighty-two degrees Fahrenheit and a water pH maintained between 6.8 and 7.4.

Having thus described the invention, what is claimed and desired to be secured by Letters Patent is:

1. A method of raising fish in a self contained system comprising
   pumping water from a fish growth tank through multiple filter tanks containing a filter media and bacteria and recirculating the water within the system,
   continuously monitoring the oxygen content of the water with a sensor and adding oxygen to the system when the oxygen level falls below about four parts per million,
   continuously monitoring the temperature of the water and adding heat to the water when the water temperature falls below the normal temperature for maintaining the fish stock,
   pressurizing each filter tank with air from a blower, the blower being adapted to provide sufficient air to back wash the filter tank when solids inhibit a normal filtering step,
   flowing the effluent from each backwash cycle to a rock sludge digestion area and recovering the water used in the backwash system for direct introduction into the fish growth tank so that water is maintained at a constant level in the tank without the need for an outside source of water except to replace water lost by evaporation.

2. The method of raising fish according to claim 1 wherein the water from the fish growth tank is pumped through at least four filter tanks containing various filter media, one tank containing activated charcoal and one tank containing lava rock, the filter tanks additionally containing bacteria from the group consisting of Nitrosomonas, Nitrobacter, *Thiobacillus denitrifican* and Azotobacter.

3. The method of raising fish according to claim 2 wherein a first filter tank contains a mixture of solid gravel and hollow ceramic core gravel and a second tank in series contains activated charcoal.

4. The method of raising fish according to claim 3 wherein a third filter tank in series contains hollow ceramic core chips, a fourth filter tank contains plastic bio-media and a fifth tank contains deflector plastic bio-media.

5. The method of raising fish according to claim 4 wherein water effluent from the fifth tank flows across lava rock prior to entering the fish growth tank.

6. The method of raising fish according to claim 1 wherein the water contains up to 33,000 ppm salt and at least one filter tank contains oyster shell particles.

7. The method of raising fish according to claim 1 wherein oxygen is continuously bubbled into the fish growth tank located below hydroponic plants growing along an edge of the tank and effluent from a sump below the fish growth tank is routed to the first filter tank.

8. The method of raising fish according to claim 1 wherein the water is heated in a solar heating area whenever the temperature in the fish growth tank falls below a minimum set temperature.

9. The method of raising fish according to claim 1 wherein a woven canopy is mounted spaced apart over the fish growth tank.

10. The method of raising fish according to claim 1 wherein excess oxygen is pumped into the fish growth tank automatically in response to an oxygen sensor mounted in the fish growth tank, when the oxygen sensor detects a decrease in oxygen below a pre-set amount.

* * * * *